June 5, 1962

N. E. WATSON ET AL 3,037,469

MINIMUM TILLAGE PLANTER

Filed May 23, 1960

INVENTORS
NORMAN E. WATSON
JOHN W. WATSON

BY

*Schmieding and Fritz*

ATTORNEYS

United States Patent Office 3,037,469
Patented June 5, 1962

3,037,469
MINIMUM TILLAGE PLANTER
Norman E. Watson and John W. Watson, both of R.F.D. 3, London, Ohio
Filed May 23, 1960, Ser. No. 30,965
11 Claims. (Cl. 111—52)

This invention relates to apparatus for planting seeds.

In general, the planter apparatus of the present application are modifications of the various planter apparatus disclosed in my co-pending application Serial No. 839,988 filed September 11, 1959, which is a continuation-in-part of my co-pending application Serial No. 823,449 filed June 29, 1959. The various apparatus of the present invention are adapted to automatically plant seeds in spaced rows by a novel method which will be referred to herein as minimum tillage planting. This type of planting consists of forming compacted spaced bands of earth along the surface of a field with intermediate wider bands of non-compacted earth intermediate said compacted bands.

The seed is next planted only in the compacted rows, the loosely plowed intermediate non-compacted bands of earth serving to receive and retain rain water and effectively deliver same to the adjacent compacted bands whereby the seeds and plants will be effectively provided with water throughout the growing season.

As one important advantage, minimum tillage planting results in the rapid germination of the seed. This type of planting provides relatively narrow seed beds of compacted earth from which entrapped air has been removed. The seeds are placed on the prepared seed bed and osmotic action causes the moisture present in the earth to move upwardly in the compacted seed beds and into contact with the seeds. Since the seeds are in contact with moist earth the seeds germinate immediately after planting instead of waiting for the arrival of the next rain.

As another important advantage of minimum tillage planting each seed bed which is properly prepared for rapid germination has on each side of it an uncompacted root bed that permits rain to penetrate to the roots of the plants throughout the growing season. In addition, since the soil in the uncompacted root beds is not worked after plowing air will be entrained. Such entrained air is necessary for the growth of beneficial bacteria on the roots of the plant as they spread out into the root beds during the growing season.

As still another advantage of minimum tillage planting the relatively wide uncompacted root beds provide a poor environment for the germination of weed seeds since the subsurface moisture cannot work upwardly through the uncompacted soil by osmotic action.

In the instance of corn planting the seeds need a seed bed for approximately ten days and a root bed for approximately six months' growing season. Hence it will be understood that minimum tillage planting, and apparatus constructed according to the present invention, condition the field to take care of the specific requirements of both the germinating seed and the growing plants.

In general, the planter apparatus of the present invention is in the form of a self-propelled vehicle. In the preferred form a conventional tractor is modified by a novel attachment structure that includes steerable laterally spaced ground engaging portions or compacting wheels mounted to the forward end of the tractor and seed dispensing means mounted to the frame of the tractor in longitudinal alignment with the path of the compacting wheels.

If desired, laterally spaced hoe means and laterally spaced fertilizer dispensers can be mounted in longitudinal alignment with the path of the compacting wheels.

In accordance with the present invention, each of the compacting wheels is attached to the frame by a mount that includes a pressure equalizing means for maintaining substantially equal pressure between the compacting wheels and the ground notwithstanding variations in the vertical positions of the compacting wheels.

It is therefore an object of the present invention to provide a novel self-propelled planter apparatus for minimum tillage planting that automatically plants seed in spaced compacted bands of earth separated by intermediate bands of noncompacted earth to more effectively water the seed and growing crop and thereby achieve increased yield per acre.

It is another object of the present invention to provide a novel self-propelled planter apparatus of the type described that includes a plurality of laterally spaced compacting wheels, longitudinally aligned with a plurality of seed dispensing means that follow, said wheels being arranged to engage the earth with substantially equal pressure notwithstanding variations in the surface level of the earth whereby spaced equally compacted bands of earth are formed by the compacting wheels.

It is still another object of the present invention to provide a planter attachment apparatus for a conventional tractor which serves to economically and efficiently adapt the tractor for minimum tillage planting.

Further objects and advantages of the present invention will be apparent from the following description, reference being had to the accompanying drawings wherein a preferred form of embodiment of the invention is clearly shown.

Referring in detail to the drawings the apparatus of the present invention includes a self-propelled main frame indicated generally at 20 which includes an engine compartment 116 for operating the conventional tractor driving wheels 18.

Figure 2:
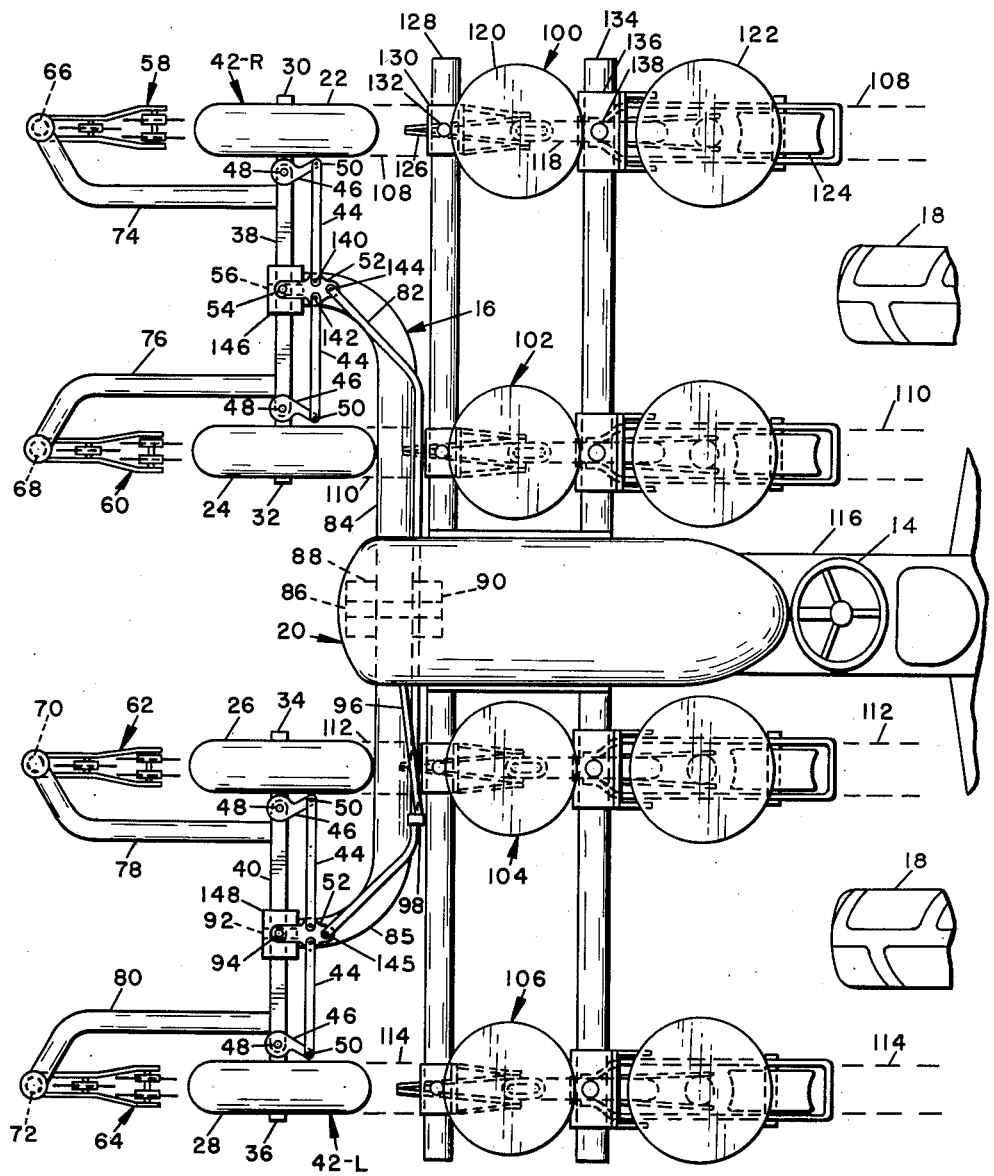
FIG. 2 is a plan view of the planter of FIG. 1.
Figure 3:
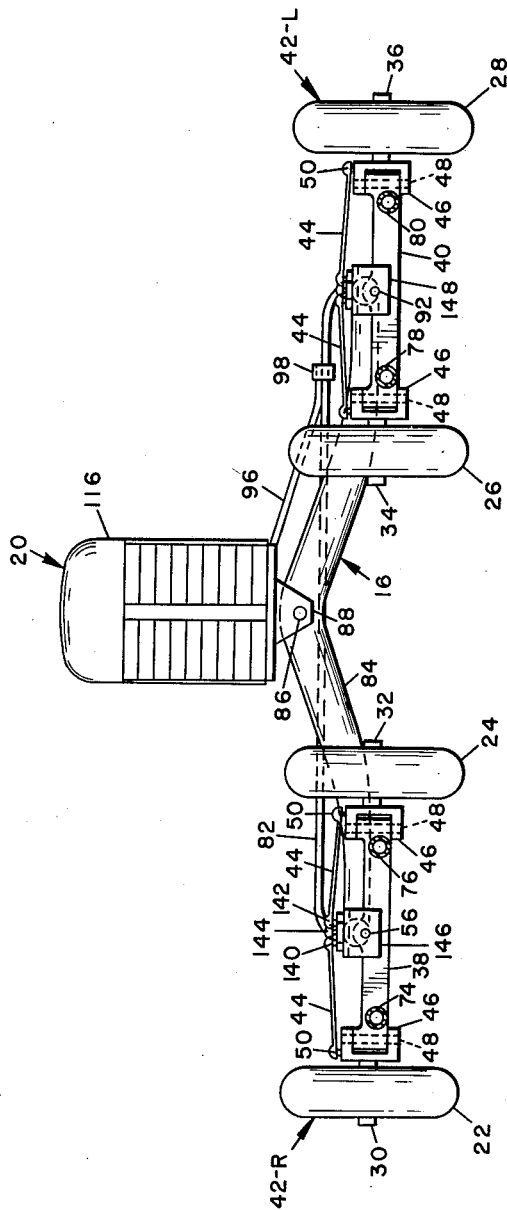
FIG. 3 is a partial front elevational view of the planter of FIG. 1.

With reference to FIG. 2 forward auxiliary frame portion indicated generally at 16 is pivotally mounted to main frame 20 at longitudinally extending bearing rod 86 that is supported by brackets 88 and 90, said bearing rod 86 being extended through a bearing hole through the center of auxiliary frame means 16.

Forward frame portion 16 includes a right laterally extending wheel support portion 84 and a left laterally extending wheel support portion 85.

Reference is next made to a right pair of spaced compacting wheels 42–R. The mechanism for mounting and steering the right pair of wheels will be discussed in detail, it being understood that a left pair of spaced compacting wheels 42–L include identical supporting and steering apparatus.

Said wheel support portion 84 carries a bracket 146 that includes front and rear spaced vertically extending flanges. A right axle member 38 extends between the flanges of bracket 146 and is pivotally attached thereto by a longitudinally extending pivot pin 56. Right and left spindles 32 are mounted on right and left yokes 46 and 48 and provide steerable mounting means for attaching said wheels 22 and 24 to the right axle members 38.

Yokes 48 include levers 46 that are connected to a plate 52 pivotally mounted on the top of bracket 146 by a vertically extending pivot pin 54. Lever 52 is actuated by means of a tie rod 82 the right end of which is connected to lever 52 at a pivot pin 144. A steering rod 96 connects tie rod 82 to the conventional steering arm, not illustrated, operated by a manual steering actuator 14. A connector 98 serves to attach the end of steering rod 96 to tie rod 82. The left pair of compacting wheels 42–L include a left axle member 40, longitudinally extending pivot pin 92, and associated steering apparatus of the type previously described. It will be noted that the left end of tie rod 82 is connected to left steering lever 52 at a pivot pin 145.

Figure 1:
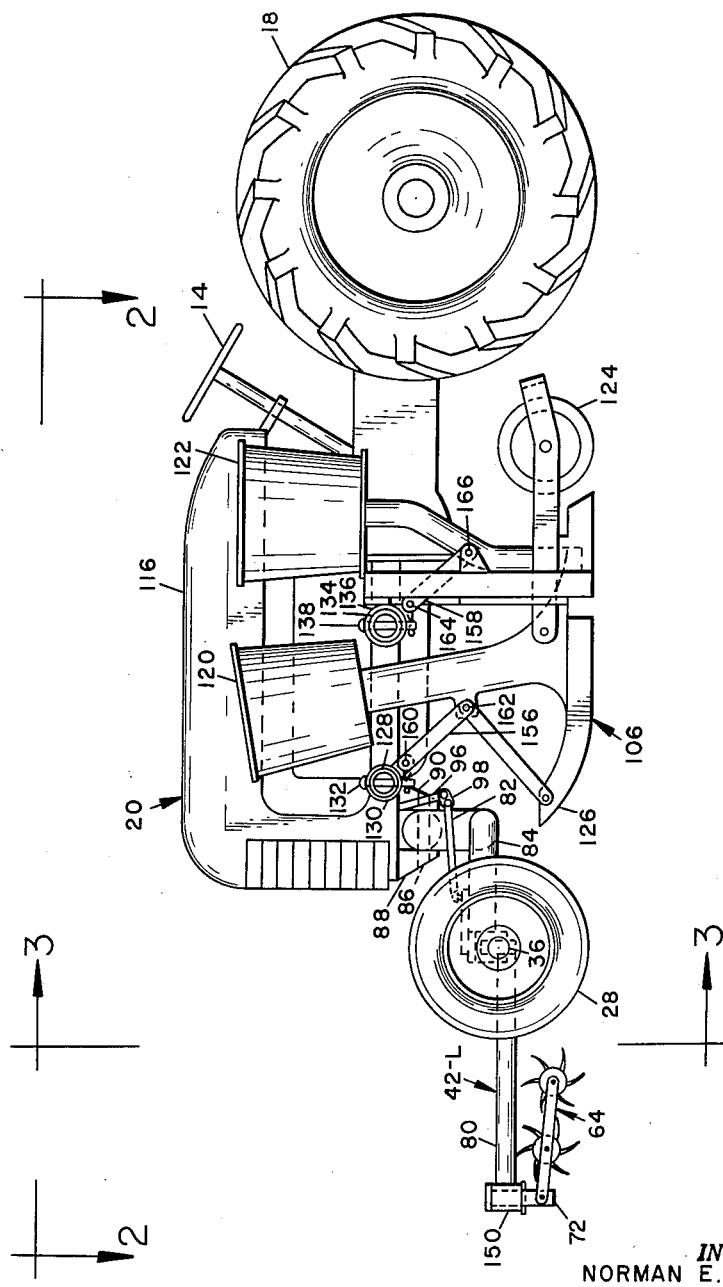
FIG. 1 is a side elevational view of a minimum tillage planter constructed in accordance with the present invention.

A plurality of laterally spaced hoe means 58—64, are mounted forwardly of and in longitudinal alignment with the compacting wheels by means of forwardly extending members 74—80 at vertically extending pivot bearings 66—72. As seen in FIG. 1 each of the pivot bearings 66—72 includes a female bearing portion 150.

With continued reference to FIGS. 1 and 2 a plurality of seed dispensing means indicated generally at 100—106 are mounted for independent vertical movement on transverse frame members 128 and 134 by parallel linkages each of which includes a front link 156 and a rear link 158. The upper end of front link 156 is attached to a laterally adjustable collar 130 and the lower end of the link is attached to a respective seed dispensing means at a pivot 162. The upper end of rear link 158 is attached to a laterally adjustable collar 136 and the lower end of the link is attached to the seed dispensing means 106 at a lower pivot 166.

Each of the seed dispensing means includes a hopper 120 and shoe 126 and is mounted to main frame 20 for lateral adjustment by means of collars 130 and 136 which are attached to transverse frame member 128—134 respectively by pins 132 and 138 that are inserted in holes drilled through the frame and surrounding collars.

If desired each of the seed dispensing means 100—106 can be provided with a fertilizer releasing means 122.

In operation, the tractor is driven across a field to be planted and rotary hoe means 58—64 serve to break up the clumps of plowed ground and release air entrained therein. Compacting wheels 22—28 which support a major portion of the weight of the tractor or main frame engage the ground and form spaced compacted bands of earth 108—118. The shoes 126 next open furrows in the compacted bands of earth and the seed dispensing apparatus release seeds into the furrows at spaced intervals. Fertilizer dispensing means 122, if used, release fertilizer into the furrows and a plurality of small trailing wheels 124 serve to close the seeded furrows.

When one of the right pair of compacting wheels 42–R, such as wheel 22, engages a high ridge of ground it will move upwardly, relative to the frame, with a corresponding downward movement of wheel 24 since axle 38 is free to pivot about longitudinally extending pivot pin 56. When wheel 24 engages a high ridge of ground the opposite wheel 22 moves downwardly. Hence it will be understood that each of the two compacting wheels at all times engage the earth with equal pressures whereby uniform compacting is achieved.

The same pressure equalizing action is continuously maintained at the left pair of compacting wheels 42–L.

When both the right compacting wheels 22 and 24 engage a high ridge of ground relative to the level of the ground engaged by left compacting wheels 26 and 28, the right laterally extending portion 84 of auxiliary frame means 16 will move upwardly and the left laterally extending portion 85 will move downwardly. Since auxiliary frame means 16 is pivotally attached at its center to main frame 20 at longitudinally extending pivot 82 it will be understood that the right pair of compacting wheels 42–R will at all times carry one-half of the weight supported by the front wheel assembly, and the left pair of compacting wheels 42–L will always carry the other half of said weight. Hence all four compacting wheels will at all times engage the earth with equal pressure whereby uniform compacting is achieved.

While the form of embodiment of the present invention as herein disclosed constitutes a preferred form, it is to be understood that other forms might be adopted, all coming within the scope of the claims which follow.

We claim:
1. A self-propelled wheel track planter comprising, in combination, frame means including a rear frame portion and a forward frame portion forming a right laterally extending wheel support portion and a left laterally extending wheel support portion; driving wheels for supporting said rear portion of said frame means; power means on said frame means for operating said driving wheels; a right pair of laterally spaced compacting wheels mounted on said right wheel support portion; a left pair of laterally spaced compacting wheels mounted on said left wheel support portion, said compacting wheels serving to form spaced compacted bands of earth along the ground; mounting means between each of said pairs of compacting wheels and a respective wheel support portion for vertically movably attaching said wheels to said frame, said mounting means including pressure equalizing means for maintaining substantially equal pressure between each of said compacting wheels and said ground notwithstanding variations in the vertical positions of said compacting wheels; a plurality of laterally spaced seed dispensing means mounted on said frame means, each of said seed dispensing means being in substantial alignment with a respective one of said compacting wheels for depositing seed in a respective compacted band of earth; and a steering mechanism on said frame means and operatively connected to each of said pairs of compacting wheels.

2. The apparatus defined in claim 1 that includes a plurality of laterally spaced hoe means mounted to said frame means forwardly of said compacting wheels, each of said hoe means being longitudinally aligned with a respective one of said compacting wheels for up-turning a respective band of earth prior to compacting of said band by a respective compacting wheel.

3. The apparatus defined in claim 1 wherein said forward frame portion is pivotally mounted to said rear frame portion for pivotal movement about a longitudinally extending axis.

4. A self-propelled wheel track planter comprising, in combination, frame means including a rear frame portion and a forward frame portion forming a right laterally extending wheel support portion and a left laterally extending wheel support portion; driving wheels for supporting said rear portion of said frame means; power means on said frame means for operating said driving wheels; a right axle pivotally mounted intermediate its ends to said right wheel support portion of said frame means; a left axle pivotally mounted intermediate its ends to said left wheel support portion; a right pair of laterally spaced compacting wheels mounted on said right axle with said pivotal mount intermediate said wheels; a left pair of laterally spaced compacting wheels mounted on said left axle with said pivotal mount intermediate said wheels; a plurality of laterally spaced seed dispensing means mounted on said frame means, each of said seed dispensing means being in substantial alignment with a respective one of said compacting wheels for depositing seed in a respective compacted band of earth; and a steering mechanism on said frame means and operatively connected to each of said pairs of compacting wheels.

5. The apparatus defined in claim 4 that includes a plurality of laterally spaced hoe means mounted to said frame means forwardly of said compacting wheels, each of said hoe means being longitudinally aligned with a respective one of said compacting wheels for up-turning a respective band of earth prior to compacting of said band by a respective compacting wheel.

6. The apparatus defined in claim 4 wherein said forward frame portion is pivotally mounted to said rear frame portion for pivotal movement about a longitudinally extending axis.

7. A self-propelled wheel track planter comprising, in combination, a frame; a plurality of laterally spaced seed dispensing means mounted on said frame for dispensing seed in parallel paths in the direction of travel of said planter; a plurality of supporting means forwardly of and including ground engaging portions confined to substantial alignment with said paths for supporting said frame and compacting said paths of said seed dispensing means; mounting means vertically movably attaching each of said supporting means to said frame including pressure equalizing means for maintaining substantially equal pressure between each of said ground engaging portions and the ground notwithstanding variations in the vertical positions of said ground engaging portions; driving wheels mounted on said frame rearwardly of said supporting means; power means on said frame for operating said driving wheels; and a steering mechanism on said frame means and operatively connected to said plurality of supporting means.

8. The planter defined in claim 7 that includes a plurality of hoe means mounted to said frame forwardly of said ground engaging portions.

9. The planter defined in claim 7 that includes a plurality of furrow closing means mounted to said frame rearwardly of said ground engaging portions.

10. In a self-propelled wheel track planter the combination of a farm tractor including frame means, an engine, driven rear wheels, and a steering lever; a laterally extending wheel support member centrally mounted on the front end of said tractor frame means and including a right wheel support portion and a left wheel support portion; a plurality of laterally spaced compacting wheels; mounting means for vertically movably mounting each of said compacting wheels to said wheel support member, said mounting means including pressure equalizing means for maintaining substantially equal pressure between each of said compacting wheels and said ground notwithstanding variations in the vertical positions of said compacting wheels; a plurality of seed dispensing means mounted on said tractor frame means, each of said seed dispensing means being in substantial longitudinal alignment with a respective one of said compacting wheels; and a steering mechanism operatively connecting said steering lever with said compacting wheels.

11. In a self-propelled wheel track planter the combination of a farm tractor including frame means, an engine, driven rear wheels, and a steering lever; a laterally extending wheel support member centrally mounted on the front end of said tractor frame means and including a right wheel support portion and a left wheel support portion; a right axle pivoted intermediate its ends to said right wheel support portion; a left axle pivoted intermediate its ends to said left wheel support portion; a right pair of compacting wheels on said right axle; a left pair of compacting wheels on said left axle; a plurality of seed dispensing means mounted on said tractor frame means, each of said seed dispensing means being in substantial longitudinal alignment with a respective one of said compacting wheels; and a steering mechanism operatively connecting said steering lever with said compacting wheels.

References Cited in the file of this patent
UNITED STATES PATENTS

| 2,032,657 | Frederickson | Mar. 3, 1936 |
| 2,479,893 | Allard | Aug. 23, 1949 |
| 2,930,335 | Hage | Mar. 29, 1960 |

FOREIGN PATENTS

| 153,383 | Australia | Sept. 24, 1953 |
| 200,858 | Great Britain | July 23, 1923 |

OTHER REFERENCES

Successful Farming, vol. 54, No. 12, December 1956 (pages 34 and 35 relied on).